United States Patent [19]
Nielsen et al.

[11] 4,112,126
[45] Sep. 5, 1978

[54] PROCESS FOR COUNTER-COLORING OF DECHARACTERIZED MEAT PRODUCTS

[75] Inventors: Ramon W. Nielsen, Simi Valley, Calif.; Craig C. Widmar, Amherst, Mass.

[73] Assignee: Carnation Company, Los Angeles, Calif.

[21] Appl. No.: 772,466

[22] Filed: Feb. 28, 1977

[51] Int. Cl.$^2$ .................... A22C 17/10; A23K 1/10
[52] U.S. Cl. ............................. 426/250; 426/540; 426/641; 426/383; 426/646; 426/262; 426/805
[58] Field of Search ............ 426/250, 540, 646, 383, 426/262

[56] References Cited

U.S. PATENT DOCUMENTS

| | | | |
|---|---|---|---|
| 2,388,891 | 11/1945 | Williams | 426/262 |
| 2,918,374 | 12/1959 | Fresch | 426/540 |
| 3,322,545 | 5/1967 | Siehrs | 426/540 |
| 3,483,002 | 12/1969 | Stein | 426/250 |
| 3,748,147 | 7/1973 | Hale et al. | 426/250 |

*Primary Examiner*—Jeanette M. Hunter
*Attorney, Agent, or Firm*—Eugene C. Ziehm; Robert D. Kummel

[57] ABSTRACT

Meats and meat by-products which are considered to be inedible for human consumption but which may be used in the production of animal foods are decharacterized by mixing such products with a U.S. Department of Agriculture approved FD&C decharacterizing color. When such decharacterized meat products are to be used in the production of an animal food, the decharacterized meat is counter-colored by mixing with a color which is complementary to the decharacterizing color to provide the inedible meat product with a substantially natural meat-like color. Approved FD&C colors and blends of approved FD&C colors, which are the complementary color of the FD&C color used in decharacterizing the meat product, are used in counter-coloring the meat product. Lakes of such colors and color blends may also be used.

11 Claims, No Drawings

PROCESS FOR COUNTER-COLORING OF DECHARACTERIZED MEAT PRODUCTS

BACKGROUND OF THE INVENTION

This invention relates to a process for treating meats and meat by-products which are considered to be inedible for human consumption but which may be used in the production of animal foods. More particularly, the invention relates to a process in which inedible meat products which have been decharacterized with a FD&C coloring agent are counter-colored by mixing the decharacterized meat products with a color which is complementary to the decharacterizing color to thereby provide the decharacterized meat with a substantially natural meat-like color.

Under Federal regulations, certain meats and meat by-products are considered to be inedible for human consumption but are still suitable for use in foods not intended for use as human food, such as in animal foods, particularly canned pet foods. Examples of such inedible materials include portions of carcasses having non-septic bruises or injuries, mechanically deboned beef, hand deboned beef from U.S. condemned "3-D" or "4-D" carcasses, certain portions of carcasses, such as livestock lungs, etc. However, Federal regulations require that certain meats and meat by-products which are inedible for human consumption be denatured in such a manner that the material is given a distinctive color, odor or taste in order to deter its use as food for human consumption. The denaturant must be mixed intimately with all of the material and must be applied in such quantity and manner that it cannot be removed by washing or soaking. Several approved denaturing agents which may be used to decharacterize such inedible meats and meat by-products are listed in 9 CFR 325.13(a) and include finely powdered charcoal, FD&C green No. 3 coloring, FD&C blue No. 1 coloring, and FD&C blue No. 2 coloring. Of these, finely powdered charcoal is most widely used by suppliers of such inedible materials for use in animal foods. However, the black color imparted to the inedible material by the charcoal persists throughout production of the animal food and often results in unacceptable animal food products due to a darkening or graying of the intended color of the finished pet food products. The use of the approved FD&C colors to decharacterize the inedible material has not been generally acceptable heretofore to many animal food manufacturers for the FD&C colors appear to have an affinity for and to concentrate in the cartilagenous tissue of meats and meat by-products and persists throughout production of the animal food. The resulting product is often unacceptable commercially due to the presence of the FD&C coloring agent in portions of the product.

SUMMARY OF THE INVENTION

According to the present invention, meats and meat by-products which are inedible for human consumption but which may be used in the production of animal foods, such as canned pet foods, are decharacterized by mixing the inedible material with an approved FD&C decharacterizing color. When the decharacterized inedible meat is to be used in the production of animal food, it is mixed with a counter-coloring agent which comprises a color which is the complementary color of that used in decharacterizing the inedible meat. The decharacterized meat is thereby provided with a substantially natural meat-like color which is stable throughout processing, retorting and storage of the animal food product in which the inedible meat is used. A ratio of from 2-22 parts of counter-coloring agent per part of decharacterizing color in the inedible meat on a dry color basis is effective to provide a product having a substantially meat-like color. Suitable counter-coloring agents which may be used include approved FD&C colors, combinations of approved FD&C colors, and lakes of such colors and color combinations, and may be mixed with the decharacterized meat either in dry form or as an aqueous solution.

As used herein, the term inedible meat includes both meat and meat by-products which are inedible for human consumption under Federal regulations but which may be used in the production of animal foods. The term approved FD&C color means FD&C colors which are approved for use in animal foods under U.S. Department of Agriculture regulations.

DETAILED DESCRIPTION OF THE INVENTION

According to the present invention, inedible meats and meat by-products are decharacterized by mixing the inedible material with an approved FD&C decharacterizing color, that is, FD&C green No. 3, FD&C blue No. 1 or FD&C blue No. 2 coloring. The inedible material, such as mechanically deboned beef, preferably is in ground form, that is between about 0.025 inch and 1.0 inch in size, or in the form of chunks not more than four inches in size in the longest dimension, when it is decharacterized, in order to promote thorough, uniform coloring of the inedible material. While the FD&C decharacterizing color may be in dry form when mixed with the inedible meat, it is generally preferred to decharacterize the inedible meat by mixing it with a dilute solution of the decharacterizing color. Thus, the dry FD&C coloring may be dissolved in water to provide a dilute aqueous solution of the decharacterizing color. Generally, the solution of the decharacterizing color contains from about 0.1% to 2% by weight of the FD&C color. Higher concentrations of the coloring agent may be used but are generally not required.

The inedible meat material is mixed with the FD&C color in any suitable manner which ensures intimate mixing of the decharacterizing color with the meat product, so that the inedible meat is denatured in conformance with Federal regulations. Thus, the color may be mixed with the meat on a batch or continuous basis to provide in the inedible meat an amount of the decharacterizing color in the range of from 1 to 100 parts of the FD&C color (on a dry color basis) per one million parts of meat, with an amount in the range of 5 to 30 parts per million being preferred. For example, an aqueous decharacterizing solution is prepared by dissolving 2 gms. of 90% FD&C blue No. 2 powder in 998 gms. of cold water. This 0.2% solution is then intimately mixed with mechanically deboned beef at a rate of 136 ml. per 100 lbs. of meat to provide decharacterized meat containing about 5 parts of FD&C color (on a dry basis) per one million parts of meat. The resulting decharacterized meat product may be handled, shipped and stored in any conventional manner.

When the decharacterized meat is to be used in the production of animal food, it is mixed with a counter-coloring agent which is the complementary color of the FD&C color used in decharacterizing the inedible meat.

The addition of the counter-color in this manner masks the FD&C decharacterizing color in the inedible meat and provides the decharacterized meat with a substantially natural meat-like color. Decharacterized meat which is counter-colored in this manner may be combined with other conventional ingredients used in the production of animal foods, such as canned pet foods, to provide a commercially acceptable finished product in which the presence of the decharacterizing color is not apparent.

The counter-color used will, of course, depend on the FD&C color used in decharacterizing the inedible meat. Thus, if the inedible meat is decharacterized with FD&C green No. 3, a suitable red color, which is the complementary color of green No. 3, is used to counter-color the decharacterized meat. The red counter-color may comprise an approved FD&C red color or suitable blend of approved FD&C colors capable of producing such a complementary color. For example, by mixing small amounts of FD&C yellow No. 5, FD&C yellow No. 6, and FD&C blue No. 1 with FD&C red No. 4 or FD&C red No. 3, various shades of red counter-coloring may be produced.

If the inedible meat has been decharacterized with FD&C blue No. 2, a suitable orange color, which is the complementary color of blue No. 2, is mixed with the decharacterized meat as the counter-coloring agent. Inedible meat which has been decharacterized with FD&C blue No. 2 preferably is counter-colored with an orange coloring formed of a mixture of from 2-3 parts of FD&C yellow No. 5 color per part of FD&C red No. 3 color. Appropriate blends of other FD&C colors, such as blends of FD&C yellow No. 6, FD&C yellow No. 5 and FD&C red No. 4 will also produce an orange counter-color which may be used in counter-coloring inedible meat which has been decharacterized with FD&C blue No. 2.

Similarly, inedible meat which has been decharacterized by mixing with FD&C blue No. 1 may be counter-colored by using a suitable orange color which is the complementary color of blue No. 1.

Lakes of such complementary colors may also be used in counter-coloring the decharacterized meat. Such lakes are prepared by combining the complementary FD&C color or color blend with the basic radical aluminum or calcium while extending the resulting salt on a substratum of alumina.

In counter-coloring the decharacterized meat or meat by-product, the inedible material is thoroughly mixed with the counter-color in an amount sufficient to provide a ratio of from 2 to 22 parts of counter-color (on a dry color basis) per part of decharacterizing color in the inedible meat. This level of counter-color provides the animal food product, in which the decharacterized meat is used, with a substantially meat-like color with no trace of the decharacterizing color even when the animal food product contains 25% or more of decharacterized meat. Greater amounts of the counter-color tend to provide an unnatural coloration in the finished product. Lesser amounts are inadequate to mask the decharacterizing color in the inedible meat.

The counter-color may be mixed with the decharacterized meat either in dry form or in the form of a dilute solution of the counter-color, the solution containing from about 0.1% to 2% or more, by weight of the counter-color. Thus, the counter-color may be dissolved in water to provide a dilute aqueous solution.

The counter-color may be mixed with the decharacterized meat either before the meat is combined with the other ingredients in the animal food product or at any point in the formulation of the animal food product which enables the counter-color to be thoroughly mixed with and dispersed throughout the decharacterized meat. According to one embodiment, a canned dog food, containing over 25% by weight of mechanically deboned beef which is decharacterized with FD&C blue No. 2 color and contains about 30 ppm of the color, is produced having a substantially natural meat-like color by admixing about 25-30 parts of the decharacterized meat with about 35 to 40 parts of meat or meat by-products and about 15 to 25 parts of water. A blend of dry ingredients, containing an intimate mixture of about 0.0014 parts of FD&C yellow No. 5 color, 0.00046 parts of FD&C red No. 3 color, together with vitamin and mineral supplements, is added to the mix of meat ingredients and the combined ingredients thoroughly mixed. The resulting mix, having a pH in the range of 6.3 to 6.8, is filled into containers which are sealed and retorted to provide a commercially sterile product having a substantially meat-like color.

It is to be understood that the decharacterized meat may be contacted with the counter-color by other procedures and combined with other animal food ingredients and processed into animal food products by any conventional procedure.

What is claimed is:

1. A process for treating inedible meat for use in animal foods which comprises
   contacting said inedible meat with an amount of an approved FD&C denaturing color sufficient to decharacterize the meat, and
   contacting the decharacterized meat with an amount of a counter-coloring agent sufficient to provide the meat with a substantially natural meat-like color, said counter-coloring agent comprising the complementary color of the FD&C denaturing color.

2. The process defined in claim 1 in which the inedible meat is decharacterized by mixing with a liquid containing from 0.1% to 2% by weight of a color selected from the group consisting of FD&C blue No. 2, FD&C blue No. 1 and FD&C green No. 3 to provide the inedible meat with from 1 to 100 parts of the color, on a dry basis, per one million parts of inedible meat.

3. The process defined in claim 1 in which the counter-coloring agent is a color selected from the group consisting of approved FD&C colors, blends of approved FD&C colors, lakes of approved FD&C colors, blends of lakes of approved FD&C colors, and mixtures thereof.

4. The process defined in claim 2 in which the liquid is a dilute aqueous solution.

5. The process defined in claim 1 in which the inedible meat has a particle size in the range of from 0.025 to 4 inches.

6. The process defined in claim 1 in which the FD&C denaturing color is FD&C blue No. 2 and in which the counter-coloring agent is an orange color comprising a blend of approved FM&C red and yellow colors, said counter-coloring agent being mixed with the decharacterized meat in an amount sufficient to provide the meat with from 2 to 22 parts of the counter-color per 1 part of the decharacterizing color.

7. The process defined in claim 7 in which the counter-color comprises a blend of from 2 to 3 parts of FD&C yellow No. 5 color per 1 part of FD&C red No. 3 color.

8. The process defined in claim 7 in which the decharacterized inedible meat is mixed with a liquid containing from 0.1 to 2% by weight of the counter-color.

9. The process defined in claim 7 in which the counter-color is in dry powder form when it is mixed with the decharacterized inedible meat.

10. The process defined in claim 1 in which the counter-colored decharacterized meat is mixed with animal food ingredients and processed to provide an animal food product having a substantially natural meat-like color.

11. The process defned in claim 1 in which the counter-color is mixed with animal food ingredients and the mixture combined with the decharacterized meat and processed to provide an animal food product having a substantially natural meat-like color.

* * * * *

UNITED STATES PATENT OFFICE
CERTIFICATE OF CORRECTION

PATENT NO. : 4,112,126
DATED : September 5, 1978
INVENTOR(S) : Ramon W. Nielsen and Craig C. Widmar It is certified that error appears in the above-identified patent and that said Letters Patent are hereby corrected as shown below:

Claim 7, line 1; claim 8, line 1; and claim 9, line 1; the claim reference numeral "7", each occurrence, should read - 6 - .

Signed and Sealed this

Eighth Day of April 1980

[SEAL]

Attest:

Attesting Officer

SIDNEY A. DIAMOND

Commissioner of Patents and Trademarks